(12) United States Patent
Li et al.

(10) Patent No.: US 9,570,745 B2
(45) Date of Patent: Feb. 14, 2017

(54) CATHODE ACTIVE MATERIAL AND METHOD FOR MAKING THE SAME

(71) Applicants: Jiangsu Huadong Institute of Li-ion Battery Co. Ltd., Zhangjiagang (CN); Tsinghua University, Beijing (CN)

(72) Inventors: Jian-Gang Li, Beijing (CN); Lei Wang, Beijing (CN); Xiang-Ming He, Beijing (CN); Li Wang, Beijing (CN); Jian-Jun Li, Beijing (CN); Jian Gao, Beijing (CN); Yu-Ming Shang, Beijing (CN)

(73) Assignees: Jiangsu-Huadong Institute of Li-ion Battery Co. Ltd., Zhangjiagang (CN); Tsinghua University, Beijing (CN)

( * ) Notice: Subject to any disclaimer, the term of this patent is extended or adjusted under 35 U.S.C. 154(b) by 0 days.

(21) Appl. No.: 15/099,504

(22) Filed: Apr. 14, 2016

(65) Prior Publication Data
US 2016/0233507 A1 Aug. 11, 2016

Related U.S. Application Data

(63) Continuation of application No. PCT/CN2014/088607, filed on Oct. 15, 2014.

(30) Foreign Application Priority Data

Oct. 22, 2013 (CN) .......................... 2013 1 0498618

(51) Int. Cl.
*H01M 4/525* (2010.01)
*H01M 4/505* (2010.01)
*H01M 10/0525* (2010.01)
*C01G 53/00* (2006.01)

(52) U.S. Cl.
CPC .............. *H01M 4/525* (2013.01); *C01G 53/50* (2013.01); *H01M 4/505* (2013.01); *H01M 10/0525* (2013.01); *C01P 2002/50* (2013.01); *C01P 2002/54* (2013.01); *C01P 2002/72* (2013.01); *C01P 2002/88* (2013.01); *Y02E 60/122* (2013.01)

(58) Field of Classification Search
CPC ....................................................... C01G 53/50
See application file for complete search history.

(56) References Cited

U.S. PATENT DOCUMENTS

| | | | |
|---|---|---|---|
| 6,811,925 B2* | 11/2004 | Yamato | C01G 41/00 252/519.1 |
| 2011/0129734 A1 | 6/2011 | Konishi et al. | |
| 2011/0226986 A1 | 9/2011 | Wang et al. | |
| 2012/0219861 A1 | 8/2012 | Konishi et al. | |

FOREIGN PATENT DOCUMENTS

| | | |
|---|---|---|
| CN | 101626080 B | 2/2011 |
| CN | 102651473 A | 8/2012 |
| CN | 102709543 A | 10/2012 |
| CN | 102956882 A | 3/2013 |
| CN | 102117909 B | 7/2013 |
| CN | 103259006 A | 8/2013 |

* cited by examiner

*Primary Examiner* — Peter F Godenschwager
(74) *Attorney, Agent, or Firm* — Klein, O'Neill & Singh, LLP (57) ABSTRACT

A method for making a cathode active material of a lithium ion battery, the cathode active material being represented by a chemical formula of $Li[(Ni_{0.8}Co_{0.1}Mn_{0.1})_{1-x}Mo_x]O_2$, wherein $0<x\leq0.05$. Source liquid solutions of Li, $Ni^{2+}$, $Co^{2+}$, $Mn^{2+}$, and $Mo^{6+}$ are mixed in stoichiometric ratio in a multi-carboxylic acid solution to form a solution. The solution is heated at 50° C. to 80° C. to form a wet gel. The wet gel is spray dried to form a dry gel. The dry gel is heated at a first temperature and then at a second temperature, the first temperature is in a range of 400° C. to 500° C., the second temperature is in a range of 750° C. to 850° C.

12 Claims, 9 Drawing Sheets

CATHODE ACTIVE MATERIAL AND METHOD FOR MAKING THE SAME

CROSS-REFERENCE TO RELATED APPLICATIONS

This application claims all benefits accruing under 35 U.S.C. §119 from China Patent Applications No. 201310498618.0, filed on Oct. 22, 2013 in the China Intellectual Property Office, the content of which is hereby incorporated by reference. This application is a continuation under 35 U.S.C. §120 of international patent application PCT/CN2014/088607 filed Oct. 15, 2014, the content of which is hereby incorporated by reference.

FIELD

The present disclosure relates to cathode active materials of lithium ion batteries and methods for making the same.

BACKGROUND

Lithium ion batteries having layered type lithium cobalt oxide ($LiCoO_2$) as cathode electrode and graphite type carbon as anode electrode are widely used in portable electronic devices and are developing for electric vehicle market. $LiCoO_2$ has high capacity, high voltage, long cycling life, and stable electrochemical performance, but scarce cobalt is expensive. In addition, the decomposing of $LiCoO_2$ by heat generated at the discharge state obstructs the applications of lithium ion batteries. To achieve lower price, higher specific capacity, and safety, studies have been made in new types of cathode active materials.

Current research in cathode active material of lithium ion battery has shifted to ternary materials, such as $LiNi_{1-x-y}Mn_xCo_yO_2$, which has the same layered structure as $LiCoO_2$. Particularly, $LiNi_{1/3}Co_{1/3}Mn1_{/3}O_2$ and $LiNi_{0.4}Mn_{0.4}Co_{0.2}O_2$ have similar electrochemical performance to $LiCoO_2$. Compared to $LiCoO_2$, $LiNi_{1/3}Co_{1/3}Mn1_{/3}O_2$ and $LiNi_{0.4}Mn_{0.4}Co_{0.2}O_2$ have lower cost, better thermal stability, and ease of synthesis. However, these two materials have relatively low specific capacity. To improve the specific capacity, increases in the content of Ni in the ternary materials are made, developing a series of high Ni cathode active materials, such as $LiNi_{0.5}Mn_{0.3}Co_{0.2}O_2$, $LiNi_{0.66}Co_{0.17}Mn_{0.17}O_2$, $LiNi_{0.7}Co_{0.15}Mn_{0.15}O_2$, and $LiNi_{0.8}Co_{0.1}Mn_{0.1}O_2$. $LiNi_{0.8}Co_{0.1}Mn_{0.1}O_2$ not only has a high specific capacity, but also has a good thermal stability.

However, $LiNi_{0.8}Co_{0.1}Mn_{0.1}O_2$ is still less than ideal in terms of specific capacity and capacity retention, and capacity loss after numerous cycles.

BRIEF DESCRIPTION OF THE DRAWINGS

Implementations are described by way of example only with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

One embodiment of cathode active material of a lithium ion battery is represented by the chemical formula $Li[(Ni_{0.8}Co_{0.1}Mn_{0.1})_{1-x}Mo_x]O_2$, wherein $0<x\le0.05$. In another embodiment, $0<x\le0.02$. In yet another embodiment, $x=0.01$.

One embodiment of a method for making the cathode active material of the lithium ion battery comprises steps of:

S1, providing Li source liquid solution, $Ni^{2+}$ source liquid solution, $Co^{2+}$ source liquid solution, $Mn^{2+}$ source liquid solution, and $Mo^{6+}$ source liquid solution;

S2, mixing the Li source liquid solution, $Ni^{2+}$ source liquid solution, $Co^{2+}$ source liquid solution, $Mn^{2+}$ source liquid solution, and $Mo^{6+}$ source liquid solution in a stoichiometric ratio in a multi-carboxylic acid solution to form a sol;

S3, heating the sol at a temperature in a range from 50° C. to 80° C. to form a wet gel;

S4, spray drying the wet gel to form a dry gel;

S5, heating the dry gel at a first temperature and then at a second temperature, the first temperature is in a range from 400° C. to 500° C., the second temperature is in a range from 750° C. to 850° C.

In step S1, the Li source liquid solution, $Ni^{2+}$ source liquid solution, $Co^{2+}$ source liquid solution, $Mn^{2+}$ source liquid solution, and $Mo^{6+}$ source liquid solution can be separately formed by dissolving a Li source, a $Ni^{2+}$ source, a $Co^{2+}$ source, a $Mn^{2+}$ source, and a $Mo^{6+}$ source in a or some liquid solvents.

The Li source, $Ni^{2+}$ source, $Co^{2+}$ source, $Mn^{2+}$ source, and $Mo^{6+}$ source are all soluble in the liquid solvent. The Li source can be selected from one or more of lithium chloride, lithium sulfate, lithium nitrate, lithium dihydrogen phosphate, and lithium acetate. The $Ni^{2+}$ source can be selected from one or more of nickel nitrate, nickel sulfate, nickel chloride, and nickel acetate. The $Co^{2+}$ source can be selected from one or more of cobalt nitrate, cobalt sulfate, cobalt chloride, and cobalt acetate. The $Mn^{2+}$ source can be selected from one or more of manganese nitrate, manganese sulfate, manganese chloride, and manganese acetate. The $Mo^{6+}$ source can be selected from one or more of molybdenum oxide ($MoO_3$) and ammonium molybdate.

The liquid solvent is capable of dissolving the Li source, $Ni^{2+}$ source, $Co^{2+}$ source, $Mn^{2+}$ source, and $Mo^{6+}$ source, and the liquid solvent can be water. For the $MoO_3$, the liquid solvent can be ammonia water.

In the Li source liquid solution, $Ni^{2+}$ source liquid solution, $Co^{2+}$ source liquid solution, $Mn^{2+}$ source liquid solution, and $Mo^{6+}$ source liquid solution, the Li, Ni, Co, Mn, and Mo are in the ionic state.

In step S2, the Li source liquid solution, $Ni^{2+}$ source liquid solution, $Co^{2+}$ source liquid solution, $Mn^{2+}$ source liquid solution, and $Mo^{6+}$ source liquid solution are mixed in a solution of multi-carboxylic acid, wherein a molar ratio of Ni:Co:Mn is 0.8:0.1:0.1, a molar ratio of Li:(Ni+Co+Mn):Mo is 1:(1−x):x, and $0<x\leq0.05$.

The multi-carboxylic acid and the transition metal ions can form a sol through complexation. The sol can have dehydration condensation between molecules to form molecular chains, which forms the gel.

The multi-carboxylic acid solution can be formed by dissolving the multi-carboxylic acid in a liquid solvent, which can be water. The multi-carboxylic acid comprises at least two carboxyl groups in one molecule. The multi-carboxylic acid can be one or more of citric acid ($C_6H_8O_7$), acetic acid ($H_2C_2O_4$), ethylenediamine tetraacetic acid, hexanedioic acid, malonic acid ($C_3H_4O_4$), and butanedioic acid ($C_4H_6O_4$). The multi-carboxylic acid can have a complexation reaction with the transition metals $Ni^{2+}$, $Co^{2+}$, $Mn^{2+}$, and $Mo^{6+}$, and is uniformly dispersed in the liquid phase. The continuous phase formed is a liquid, which is the sol.

In step S2, the Li source liquid solution, $Ni^{2+}$ source liquid solution, $Co^{2+}$ source liquid solution, $Mn^{2+}$ source liquid solution, and $Mo^{6+}$ source liquid solution are respectively added to the multi-carboxylic acid solution while the multi-carboxylic acid solution is being stirred.

In the sol, a total concentration of all of the metal ions can be 1 mol/L to 3 mol/L (e.g., 2 mol/L). A ratio of the multi-carboxylic acid to all of the metal ions can be larger than or equal to 1:1. The 1:1 ratio of the multi-carboxylic acid to all of the metal ions can form a stable sol-gel. A higher concentration of the metal ions makes it easy to form a precipitation during the forming of the sol-gel, which makes it difficult to achieve a transparent dry gel. On the other hand, a higher concentration of the multi-carboxylic acid does not affect the forming of the sol-gel.

In step S3, by heating the sol, the multi-carboxylic acid can have an intermolecular dehydration condensation reaction, such as an esterification reaction or a reaction generating an acid anhydride, to form a chain shaped or a network shaped aggregation. With the evaporation of the liquid solvent, the viscosity of the aggregation increases, thereby forming the wet gel. The heating temperature can be 50° C. to 80° C. (e.g., 60° C.). The heating time can be based on the amount of the sol, such as 8 to 10 hours. The heating step can be carried out in the open air.

In step S4, a pneumatic spray dryer can be adopted for spray drying the wet gel. By using a peristaltic pump, the wet gel under the action of a hot air stream can be transferred into the pneumatic type spray dryer. The wet gel can be atomized under pressure in the pneumatic type spray dryer to form a mist of droplets. A concurrent flow of the mist of droplets and hot air is formed, and almost all of the solvent is instantly evaporated from the mist of droplets in the hot air, thereby forming a plurality of porous particles (i.e., a solid dry gel). Throughout the process, the hot air at the inlet of the pneumatic spray dryer can be controlled in a range of 160° C. to 200° C. (e.g., 180° C.), and the air after the dry gel is formed is in a range of 65° C. to 70° C.

The spray drying method can disperse the wet gel into a fine mist of droplets, so that the atomized wet gel can have a large specific surface area. After the heat exchange between the mist of droplets and the hot air, the solvent in the wet gel is rapidly eliminated, within a few seconds to tens of seconds, to form the porous dry gel particles. The dry gel has a light green color and is transparent.

Figure 1:
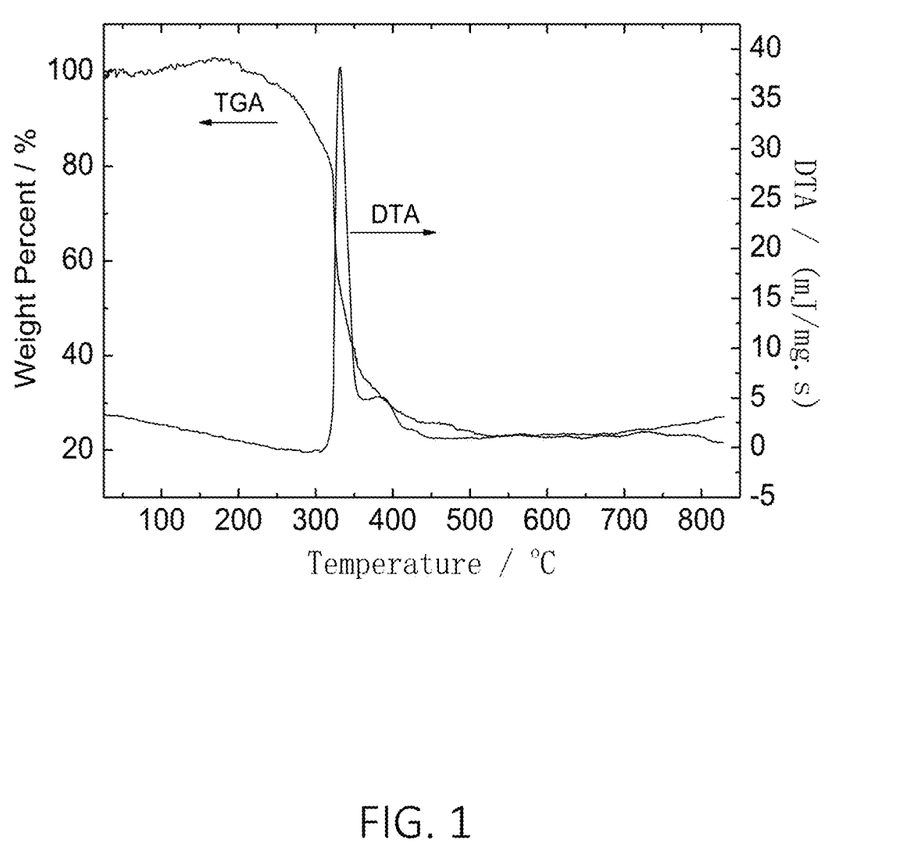
FIG. 1 shows TG-DTA curves of an embodiment of a dry gel formed in the method for making cathode active material.

Referring to FIG. 1, the thermal gravimetric analysis and differential thermal analysis (TG-DTA) for the dry gel are processed. The temperature of the dry gel is raised from room temperature to 900° C. at a uniform rate of 10° C./min. Weight loss and endothermic peak within 25° C. to 250° C. are due to the loss of residual water molecules, and the weight loss percentage in this range is about 3%. Between 250° C. and 500° C., the weight loss percentage is about 73% and a strong endothermic peak appears, which is due to evaporation and decomposition of organic substances, ammonium salts, and nitrate compounds. The TG curve becomes relatively gentle and the DTA curve shows no significant peak between 500° C. and 750° C., which proves that no phase transition occurs at this temperature range, the heating only increases the crystallinity of the substances.

In step S5, the dry gel is heated in two temperature stages. First, the dry gel is heated to a first stage between 400° C. and 500° C. to remove the multi-carboxylic acid, ammonium salts, and nitrate compounds from the dry gel. Then, the product of the previous heating is heated to a second stage between 750° C. and 850° C. to form $Li[(Ni_{0.8}Co_{0.1}Mn_{0.1})_{1-x}Mo_x]O_2$ as the cathode active material. The heating steps, at the two temperature stages, can both be carried out in open air, or in pure oxygen gas.

One embodiment of cathode active material of lithium ion battery dopes Mo into $Li(Ni_{0.8}Co_{0.1}Mn_{0.1})O_2$ by substituting $Ni_{0.8}Co_{0.1}Mn_{0.1}$ entirely to decrease the crystalline grain size of the $Li(Ni_{0.8}Co_{0.1}Mn_{0.1})O_2$. Reducing the crystalline grain size favors the decrease of a lithium ion diffusion distance in the cathode active material, which improves the electrochemical performance of the cathode active material. The obtained cathode active material can have a relatively high discharge specific capacity and capacity retention in the lithium ion battery. The method for making the cathode active material mixes the $Li^+$, $Ni^{2+}$, $Co^{2+}$, $Mn^{2+}$, and $Mo^{6+}$ at the ion level and complexes the metal ions with the multi-carboxylic acid, followed by heating, to form the gel. Accordingly, the formed gel shows no segregation, and the ions are uniformly mixed in the dry gel, which improves the performance of the cathode active material.

Example 1 x=0.01

$LiNO_3$, $Ni(NO_3)_2 \cdot 6H_2O$, $Co(NO_3)_2 \cdot 6H_2O$, and $Mn(NO_3)_2$ are respectively dissolved in water to form solutions. $MoO_3$ is dissolved in ammonia water to form an $Mo^{6+}$ solution. The solutions are added to a stirring citrate acid water solution according the stoichiometric ratio of the metal ions in $Li[(Ni_{0.8}Co_{0.1}Mn_{0.1})_{0.99}Mo_{0.01}]O_2$ to form a sol. A total molar concentration of the metal ions in the sol is 2 mol/L. A ratio of molar amount of the citrate acid to a total molar amount of the metal ions in the sol is 1:1. The sol is heated at 60° C. for 8 hours to form a transparent wet gel. The wet gel is then spray dried to form a transparent light green dry gel. The hot air at the inlet of the pneumatic spray dryer is 180° C., and the air temperature after the dry gel is formed is in a range of 65° C. to 70° C. The dry gel is heated at 500° C. for 5 hours and then heated at 750° C. for 16 hours in oxygen atmosphere to form $Li[(Ni_{0.8}Co_{0.1}Mn_{0.1})_{0.99}Mo_{0.01}]O_2$.

The $Li[(Ni_{0.8}Co_{0.1}Mn_{0.1})_{0.99}Mo_{0.01}]O_2$ is used as the cathode active material to assemble the lithium ion battery. In the cathode of the lithium ion battery, $Li[(Ni_{0.8}Co_{0.1}Mn_{0.1})_{0.99}Mo_{0.01}]O_2$ accounts for 86 wt %, conductive carbon black is 8 wt %, and PVDF as a binder is 6 wt %. The anode of the lithium ion battery is metal lithium. The electrolyte is 1 mol/L of $LiPF_6$/EC+DEC+EMC (1:1:1, v/v/v). The assembled lithium ion battery is galvanostatically charged and discharged between 2.7V and 4.3V respectively with current densities of 0.2 C (i.e., 40 mA/g), 0.5 C, 1 C, 2 C, and 5 C.

Example 2 x=0.01

Example 2 is the same as Example 1 except that the dry gel is heated at 500° C. for 5 hours and then heated at 800° C. for 16 hours in oxygen atmosphere.

Example 3 x=0.01

Example 3 is the same as Example 1 except that the dry gel is heated at 500° C. for 5 hours and then heated at 850° C. for 16 hours in oxygen atmosphere.

Figure 2:
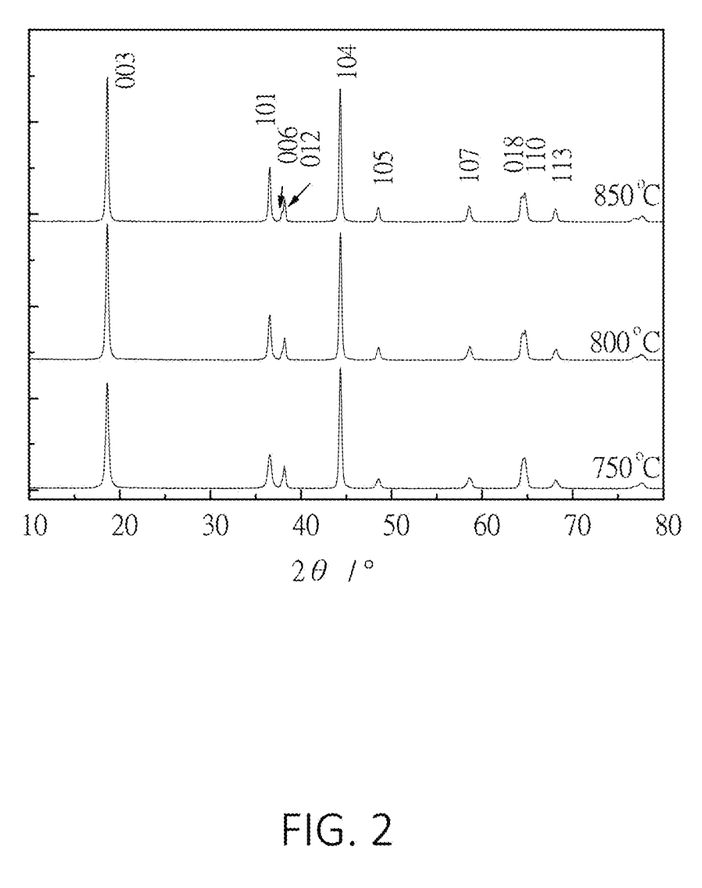
FIG. 2 shows X-ray diffraction (XRD) patterns of the cathode active material in Examples 1 to 3 of the Detailed Description.

The three $Li[(Ni_{0.8}Co_{0.1}Mn_{0.1})_{0.99}Mo_{0.01}]O_2$ samples in Examples 1 to 3 are analyzed by XRD. Referring to FIG. 2, all the XRD patterns show diffraction peaks agreeing with α-NaFeO$_2$ type crystal structure (space group R$\bar{3}$m) without impurity peaks. The higher the second temperature, the better the crystallinity. The intensity ratios of the 003 diffraction peak to 104 diffraction peak ($I_{003}/I_{104}$) of the samples are calculated. $I_{003}/I_{104}$ values of the 750° C., 800° C., and 850° C. samples are respectively 0.875, 1.063, and 1.086. In the cathode active material, $Mo^{6+}$ and $Ni^{2+}$ have similar diameters with $Li^+$, and are easy to transfer to a $Li^+$ layer causing a cationic mixed arrangement. The smaller the $I_{003}/I_{104}$ value, the greater the degree of cationic mixed arrangement resulting in electrochemical performance degradation. Therefore, the second temperature should not be relatively low, and is better to be 800° C. to 850° C. According to the calculations, when the second temperatures are respectively 750° C., 800° C., and 850° C., the crystalline grain sizes of the cathode active materials are 22 nm, 25 nm, and 33 nm, and these sizes increase with the temperature.

Figure 3:
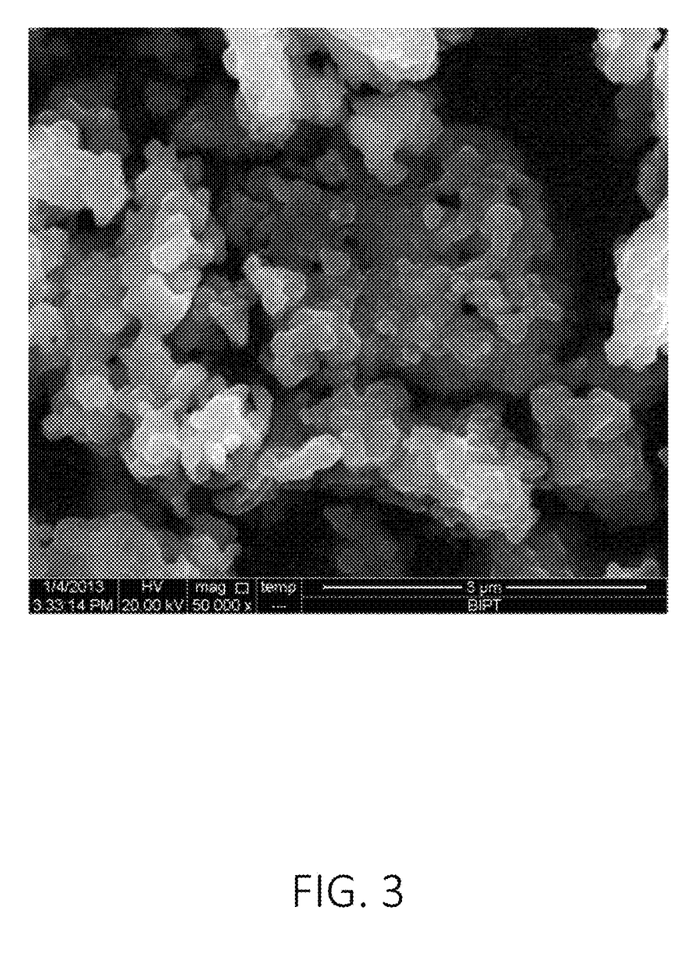
FIG. 3 shows a scanning electron microscope (SEM) image of the cathode active material in Example 1 of the Detailed Description.
Figure 4:
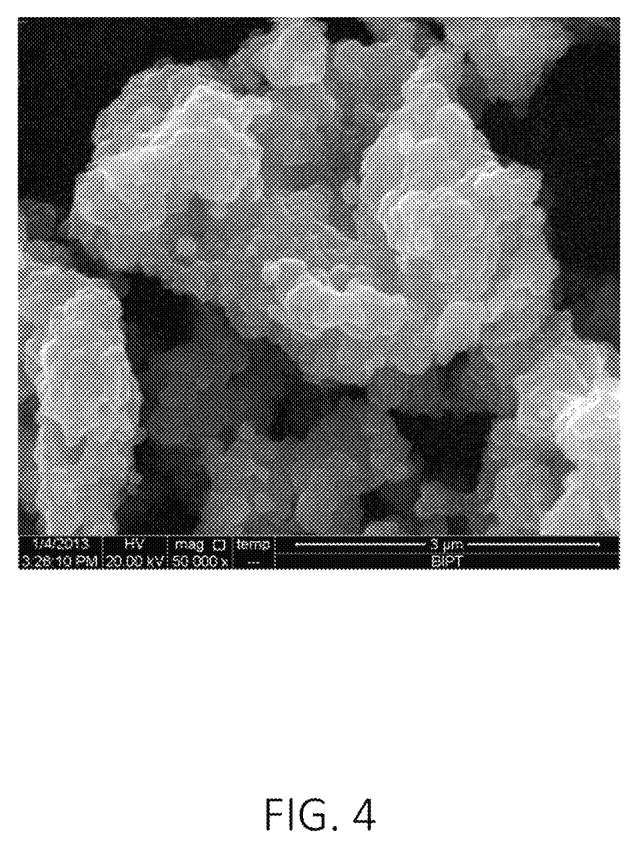
FIG. 4 shows an SEM image of the cathode active material in Example 2 of the Detailed Description.
Figure 5:
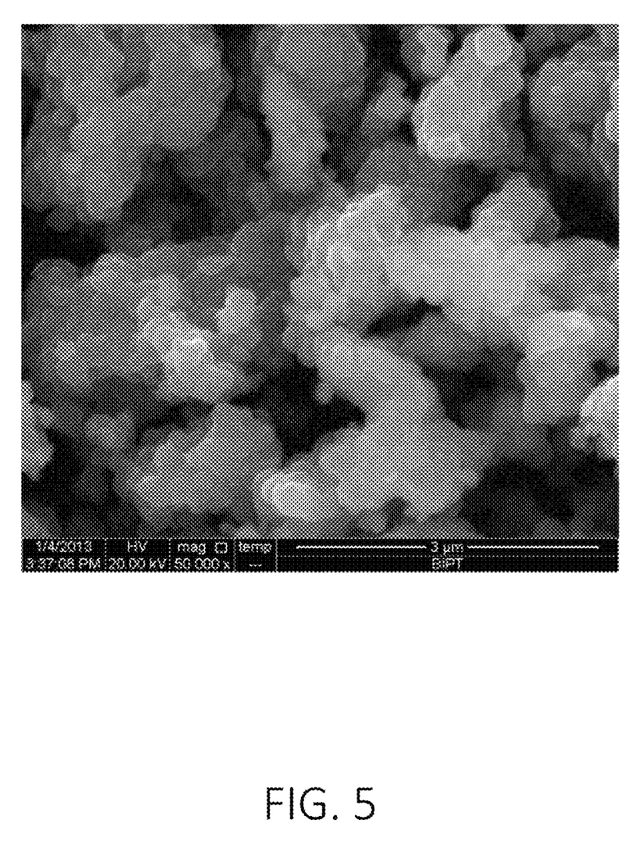
FIG. 5 shows an SEM image of the cathode active material in Example 3 of the Detailed Description.

Referring to FIG. 3 to 5, the three $Li[(Ni_{0.8}Co_{0.1}Mn_{0.1})_{0.99}Mo_{0.01}]O_2$ samples in Examples 1 to 3 are analyzed by SEM and show similar morphologies. The grain sizes of the samples are about 3 microns, and the sizes increasing with the second temperature.

Figure 6:
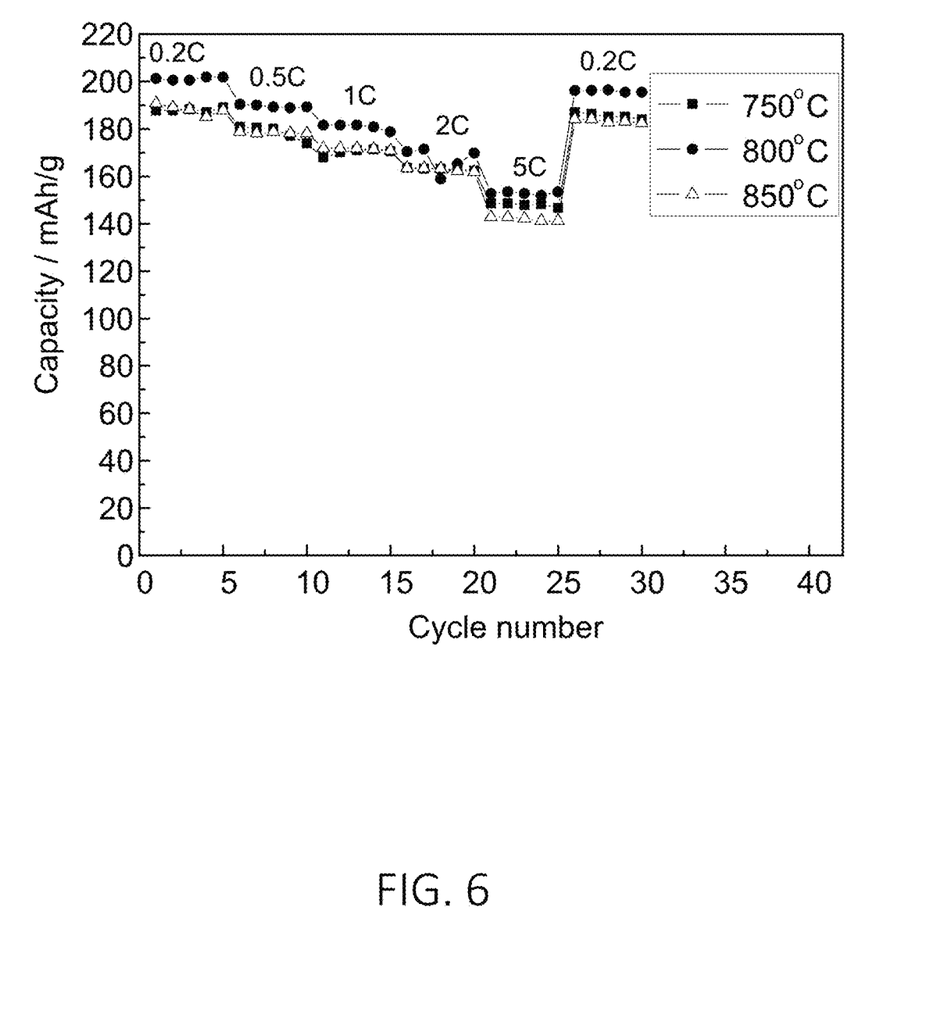
FIG. 6 shows cycling performances at different current rates of the cathode active material in Examples 1 to 3 of the Detailed Description.

Referring to FIG. 6, the lithium ion batteries assembled in Examples 1 to 3 are cycled with 0.2 C current rate. The first discharge specific capacities of the batteries in Examples 1 to 3 are 187.8 mAh/g, 201.2 mAh/g, and 190.7 mAh/g respectively. With the increased current rate, the lithium ion battery in Example 2 still shows the highest discharge capacity. This is mainly due to the higher second temperature increasing the crystallinity, but can also lead to a crystal grain size growth, so that the diffusion distance of the lithium ions is increased.

Example 4 x=0.005

Example 4 is the same as Example 2 except that the ratio of the metal ions in the sol is changed to obtain $Li[(Ni_{0.8}Co_{0.1}Mn_{0.1})_{0.995}Mo_{0.005}]O_2$ as the cathode active material. Solutions of $LiNO_3$, $Ni(NO_3)_2·6H_2O$, $Co(NO_3)_2·6H_2O$, $Mn(NO_3)_2$ and $MoO_3$ are added to a stirring citrate acid water solution according the stoichiometric ratio of the metal ions in $Li[(Ni_{0.8}Co_{0.1}Mn_{0.1})_{0.995}Mo_{0.005}]O_2$ to form the sol.

Example 5 x=0.02

Example 5 is the same as Example 2 except that the ratio of the metal ions in the sol is changed to obtain $Li[(Ni_{0.8}Co_{0.1}Mn_{0.1})_{0.98}Mo_{0.02}]O_2$ as the cathode active material. Solutions of $LiNO_3$, $Ni(NO_3)_2·6H_2O$, $Co(NO_3)_2·6H_2O$, $Mn(NO_3)_2$ and $MoO_3$ are added to a stirring citrate acid water solution according the stoichiometric ratio of the metal ions in $Li[(Ni_{0.8}Co_{0.1}Mn_{0.1})_{0.98}Mo_{0.02}]O_2$ to form the sol.

Example 6 x=0.05

Example 6 is the same as Example 2 except that the ratio of the metal ions in the sol is changed to obtain $Li[(Ni_{0.8}Co_{0.1}Mn_{0.1})_{0.95}Mo_{0.05}]O_2$ as the cathode active material. Solutions of $LiNO_3$, $Ni(NO_3)_2·6H_2O$, $Co(NO_3)_2·6H_2O$, $Mn(NO_3)_2$ and $MoO_3$ are added to a stirring citrate acid water solution according the stoichiometric ratio of the metal ions in $Li[(Ni_{0.8}Co_{0.1}Mn_{0.1})_{0.95}Mo_{0.05}]O_2$ to form the sol.

Comparative Example x=0

The Comparative Example is the same as Example 2 except that the ratio of the metal ions in the sol is changed to obtain $Li(Ni_{0.8}Co_{0.1}Mn_{0.1})O_2$ as the cathode active material. Solutions of $LiNO_3$, $Ni(NO_3)_2·6H_2O$, $Co(NO_3)_2·6H_2O$, and $Mn(NO_3)_2$ are added to a stirring citrate acid water solution according the stoichiometric ratio of the metal ions in $Li(Ni_{0.8}Co_{0.1}Mn_{0.1})O_2$ to form the sol.

Figure 7:
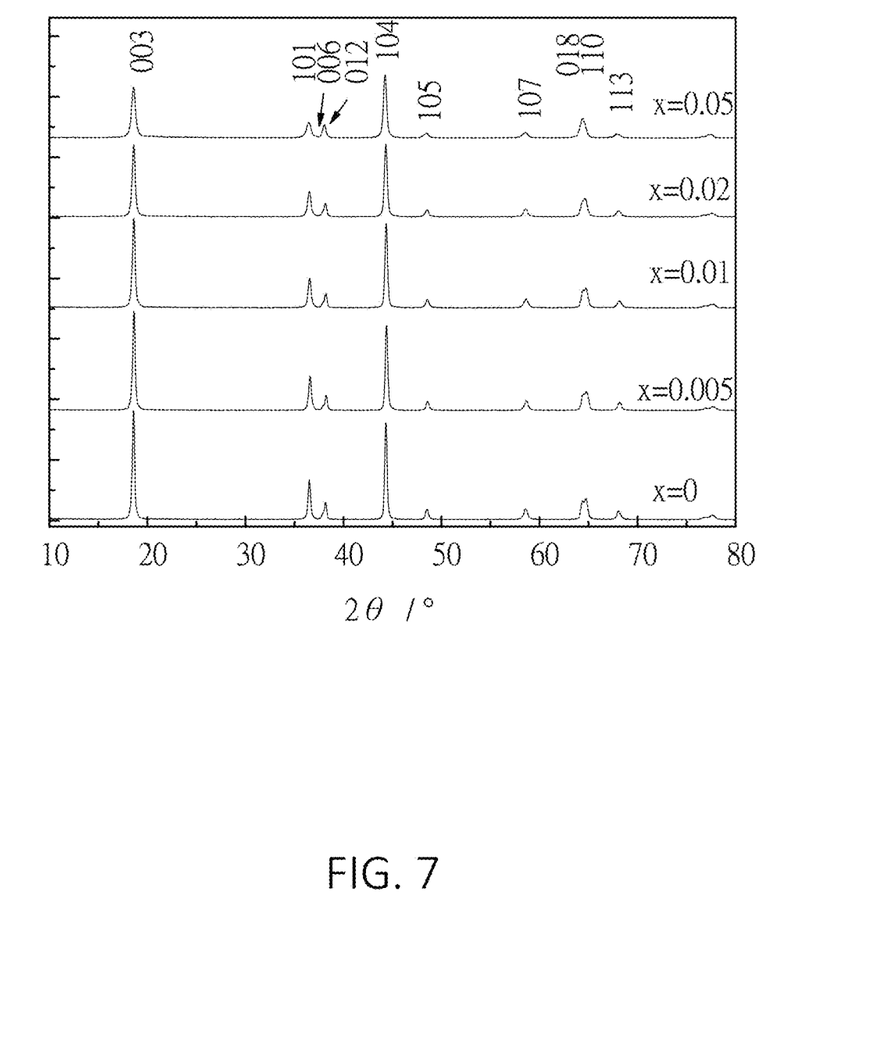
FIG. 7 shows XRD patterns of the cathode active materials in Examples 2, 4 to 6, and Comparative Example, of the Detailed Description.

The cathode active material samples in Examples 4 to 6 and in the Comparative Example are analyzed by XRD and compared with Example 2. Referring to FIG. 7, all the XRD patterns show diffraction peaks agreeing with α-NaFeO$_2$ type crystal structure (space group R$\bar{3}$m) without impurity peaks. The intensity ratios of the 003 diffraction peak to 104 diffraction peak ($I_{003}/I_{104}$) of the samples are calculated. For the samples with x=0, 0.005, 0.01, 0.02, and 0.05, the $I_{003}/I_{104}$ values are respectively 1.14, 1.14, 1.06, 0.99, and 0.81. In the cathode active material, $Mo^{6+}$ and $Ni^{2+}$ have similar diameters as the $Li^+$, and can easily transfer to a $Li^+$ layer causing a cationic mixed arrangement. The smaller the $I_{003}/I_{104}$ value, the greater the degree of cationic mixed arrangement resulting in an electrochemical performance degradation. Therefore, the x value should not be relatively large, and can be less than 0.02. According to calculations, when x=0, 0.005, 0.01, 0.02, and 0.05, the crystalline grain sizes of the cathode active materials are 29 nm, 26 nm, 25 nm, 22 nm, and 18 nm respectively. In the cathode active material, the higher the Mo content, the smaller the crystalline grain size. Reducing the crystalline grain size favors a decrease in a lithium ion diffusion distance in the cathode active material, which improves the electrochemical performance of the cathode active material.

Figure 8:
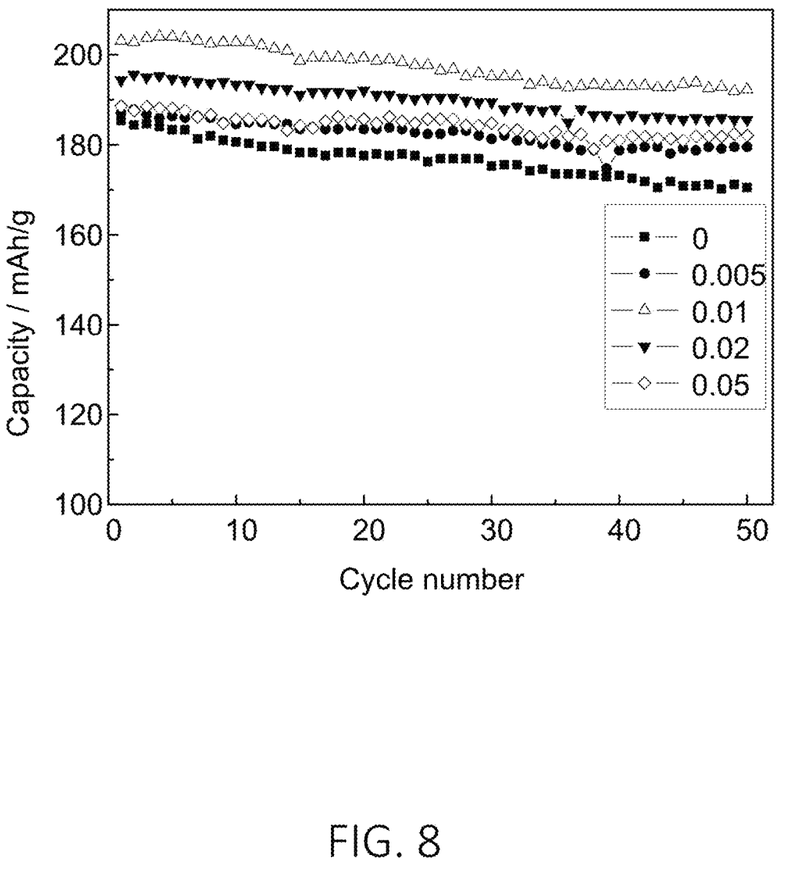
FIG. 8 shows cycling performances of the cathode active materials in Examples 2, 4 to 6, and Comparative Example, of the Detailed Description.

Referring to FIG. 8, when x=0, 0.005, 0.01, 0.02, and 0.05 respectively, the first discharge specific capacities of the lithium ion batteries with 0.2 C current rate are 185.1 mAh/g, 187.3 mAh/g, 203.1 mAh/g, 194.3 mAh/g, and 188.5 mAh/g respectively. When x=0.01, the lithium ion battery has the greater discharge specific capacity. This is because the doping of Mo into $Li(Ni_{0.8}Co_{0.1}Mn_{0.1})O_2$ utilizes more $Li^+$ during the charge and discharge. On the other hand, during the cycling, $Mo^{6+}$ is reduced to $Mo^{4+}$ to provide a portion of discharge capacity. However, increasing amount of the Mo doping may cause the cationic mixed arrangement to decrease the discharge specific capacity.

In addition, referring to FIG. 8, after 50 cycles, the capacity retentions of the Mo-doped cathode active materials are 95% to 96%. The capacity retention of the undoped $Li(Ni_{0.8}Co_{0.1}Mn_{0.1})O_2$ is only 92%, which shows that the Mo doping is good for improving the capacity retention.

Figure 9:
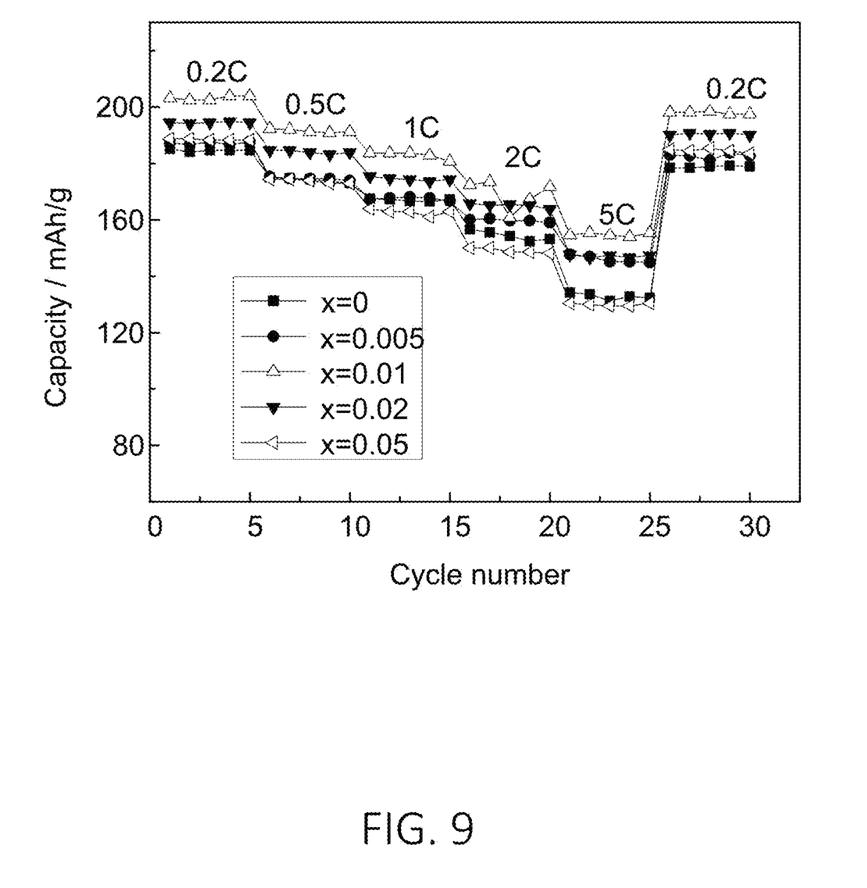
FIG. 9 shows cycling performances at different current rates of the cathode active materials in Example 2, 4 to 6, and Comparative Example, of the Detailed Description.

Referring to FIG. 9, at higher current rates, the lithium ion battery with x=0.01 has relatively high discharge specific capacities, and has 155.5 mAh/g at 5 C, which is 77% of the discharge specific capacity at 0.2 C. The undoped $Li(Ni_{0.8}Co_{0.1}Mn_{0.1})O_2$ only has 72% of the discharge specific capacity at 0.2 C.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A method for making a cathode active material of a lithium ion battery represented by a chemical formula of $Li[(Ni_{0.8}Co_{0.1}Mn_{0.1})_{1-x}Mo_x]O_2$, wherein $0<x\leq0.05$, the method comprising:

providing a Li source liquid solution, $Ni^{2+}$ source liquid solution, $Co^{2+}$ source liquid solution, $Mn^{2+}$ source liquid solution, and $Mo^{6+}$ source liquid solution;

mixing the Li source liquid solution, the $Ni^{2+}$ source liquid solution, the $Co^{2+}$ source liquid solution, the $Mn^{2+}$ source liquid solution, and the $Mo^{6+}$ source liquid solution in an stoichiometric ratio in a multi-carboxylic acid solution to form a sol;

heating the sol at 50° C. to 80° C. to form a wet gel;

spray drying the wet gel to form a dry gel;

heating the dry gel at a first temperature and then at a second temperature; wherein the first temperature is in a range of 400° C. to 500° C., and the second temperature is in a range of 750° C. to 850° C.

2. The method of claim 1, wherein a $Mo^{6+}$ source of the $Mo^{6+}$ source liquid solution is selected from the group consisting of molybdenum oxide, ammonium molybdate, and combinations thereof.

3. The method of claim 1, wherein a Li source of the Li source liquid solution is selected from the group consisting of lithium chloride, lithium sulfate, lithium nitrate, lithium dihydrogen phosphate, lithium acetate, and combinations thereof.

4. The method of claim 1, wherein a $Ni^{2+}$ source of the $Ni^{2+}$ source liquid solution is selected from the group consisting of nickel nitrate, nickel sulfate, nickel chloride, nickel acetate, and combinations thereof.

5. The method of claim 1, wherein a $Co^{2+}$ source of the $Co^{2+}$ source liquid solution is selected from the group consisting of cobalt nitrate, cobalt sulfate, cobalt chloride, cobalt acetate, and combinations thereof.

6. The method of claim 1, wherein a $Mn^{2+}$ source of the $Mn^{2+}$ source liquid solution is selected from the group consisting of manganese nitrate, manganese sulfate, manganese chloride, manganese acetate, and combinations thereof.

7. The method of claim 1, wherein the $Mo^{6+}$ source liquid solution comprises $Mo^{6+}$ source dissolved in ammonia water.

8. The method of claim 1, wherein the multi-carboxylic acid solution comprises a multi-carboxylic acid comprising at least two carboxyl groups.

9. The method of claim 8, wherein the multi-carboxylic acid is selected from the group consisting of citric acid, acetic acid, ethylenediamine tetraacetic acid, hexanedioic acid, malonic acid, butanedioic acid, and combination thereof.

10. The method of claim 8, wherein a ratio of the multi-carboxylic acid to all of metal ions is larger than or equal to 1:1.

11. The method of claim 1, wherein the heating the sol is at 60° C.

12. The method of claim 1, wherein the second temperature is 800° C.

* * * * *